(12) United States Patent
Mott

(10) Patent No.: US 7,252,060 B2
(45) Date of Patent: Aug. 7, 2007

(54) TORSIONAL DAMPER FOR BALANCE SHAFTS

(76) Inventor: Philip J. Mott, 1 Kimberly Cir., Dryden, NY (US) 13053

( * ) Notice: Subject to any disclaimer, the term of this patent is extended or adjusted under 35 U.S.C. 154(b) by 222 days.

(21) Appl. No.: 11/181,546

(22) Filed: Jul. 14, 2005

(65) Prior Publication Data
US 2007/0012277 A1   Jan. 18, 2007

(51) Int. Cl.
F01L 1/02 (2006.01)
(52) U.S. Cl. .................. 123/90.31; 123/90.17; 123/192.2
(58) Field of Classification Search ........... 123/90.15, 123/90.16, 90.17, 90.18, 90.27, 90.31, 192.1, 123/192.2; 464/180
See application file for complete search history.

(56) References Cited
U.S. PATENT DOCUMENTS

| | | | |
|---|---|---|---|
| 1,196,349 A | 8/1916 | Gilbert | |
| 5,253,547 A | 10/1993 | Yoneyama et al. | 74/604 |
| 5,507,203 A | 4/1996 | Audibert et al. | 74/492 |
| 6,109,227 A | 8/2000 | Mott | 123/90.31 |
| 6,283,867 B1 | 9/2001 | Aota et al. | 464/74 |
| 6,868,816 B2 * | 3/2005 | Hiraki et al. | 123/192.2 |

FOREIGN PATENT DOCUMENTS

| | | |
|---|---|---|
| DE | 2822589 | 11/1979 |
| DE | 19837091 | 2/2000 |
| GB | 691281 | 5/1953 |
| JP | 04-228950 | 8/1992 |
| JP | 07238971 | 2/1994 |
| JP | 06191461 | 7/1994 |

* cited by examiner

*Primary Examiner*—Ching Chang
(74) *Attorney, Agent, or Firm*—Brown & Michaels, PC; Greg Dziegielewski

(57) ABSTRACT

A drive system for an internal combustion engine including an endless chain connecting a drive sprocket on a crankshaft to a driven sprocket on a camshaft. The drive system is comprised of at least one balance shaft and a torsion bar. The balance shaft has a first end for connection to the drive sprocket and a center bore. The torsion bar is located within the center bore of the balance shaft. The torsion bar has a first end for connection to the drive sprocket and a second end fixedly attached to the inner end of the center bore. The torsion bar absorbs torsional vibrations and isolates torsional vibrations due to inertia of the balance shaft caused by the crankshaft. Bearings are located between the first end of the torsion bar and the center bore of the balance shaft, to center the torsion bar within the balance shaft.

3 Claims, 2 Drawing Sheets

TORSIONAL DAMPER FOR BALANCE SHAFTS

BACKGROUND OF THE INVENTION

1. Field of the Invention

The invention pertains to the field of isolation of vibrations in rotating systems. More particularly, the invention pertains to a balance shaft with a torsion bar.

2. Description of Related Art

The engine arrangement of cylinders and the number of cylinders influence the balance of the engine and the vibration the engine produces. Certain popular engine configurations, such as four cylinder inline engines, are kinematically unbalanced. This results in excessive levels of vibration, which often times are found to be objectionable to the end customer. Balance shafts cancel or reduce some of the vibration produced by the engine.

Prior art FIG. 1 shows a torsion bar 4 fixedly attached to a sprocket 2 in which a chain 1 is wrapped, on a first end. The second end of the torsion bar 4 is attached to the balance shaft 8. The torsion bar 4 has at least two pairs 6a, 6b of bearings on either end to maintain the position of the torsion bar 4 relative to the balance shaft 8. The balance shaft 8 contains a weight 10 on a portion of the shaft.

An example of a balance shaft used to reduce the vibration of the engine is U.S. Pat. No. 5,253,547 which discloses a balance shaft installed into an in-line engine that includes a first journal and a second journal with first and second bearings that support the shaft. The first bearing is near the front side of the engine through a retainer. The second bearing is near a generally center portion in the axial direction of the crankshaft and secured to the cylinder block. The balance shaft also includes an oil passage, which is formed along the center axis of the shaft and communicates with grooves that splash the oil onto the outer circumferential surface of the balance shaft. The splashed oil lands on the first and second journal.

JP 07-238971A discloses a torsion spring in a damper shaft, which is inserted into a tubular casing. The casing is then attached to an equipment body.

Another examples is JP 04-228950A, which discloses a balance shaft comprising an elastic rod member with spring properties that acts as torsion bar against vibration of the crankshaft. A second shaft is connected to the crankshaft via a damper member, which is positioned in parallel to the balance shaft. The damper member follows the rotation of the crankshaft. When a difference occurs between the rotation of the second shaft and another rotation due to engine output transmission through the balance shaft, a damping force is generated.

JP 06-191461A discloses torsion bars for motorcycles that act as springs and are attached to the sides of swing arm. At least one of the torsion bars is disposed within the hollow, rotating shaft of the rotary damper. When the torsion bars act as springs, the spring forces act on the right and left swing arms.

SUMMARY OF THE INVENTION

A drive system for an internal combustion engine including an endless chain connecting a drive sprocket on a crankshaft to a driven sprocket on a camshaft. The drive system is comprised of at least one balance shaft and a torsion bar. The balance shaft has a first end for connection to the drive sprocket and a center bore. The torsion bar is located within the center bore of the balance shaft. The torsion bar has a first end for connection to the drive sprocket and a second end fixedly attached to the inner end of the center bore. The torsion bar absorbs torsional vibrations and isolates torsional vibrations due to inertia of the balance shaft caused by the crankshaft. Bearings are located between the first end of the torsion bar and the center bore of the balance shaft, to center the torsion bar within the balance shaft.

The balance shafts may also be found in inline four cylinder engines, 90 degree V-6 engines, and any other engine which needs a balance shaft. The number of balance shafts will vary based on the number of cylinders in the engine.

DETAILED DESCRIPTION OF THE INVENTION

An endless chain connects a driving sprocket on the crankshaft to a driven sprocket on a camshaft. The rotation of the driving sprocket advances the chain, which turns the camshaft and the driven sprocket. Engine vibrations resulting from the unbalance of the reciprocating mass of the pistons and the connecting rods are counteracted by the balance shafts, which in a four-cylinder engine typically run at twice engine speed in opposing directions. At least one balance shaft 108 of the present invention is connected to and in time with the rotation of the crankshaft (not shown). The number of balance shafts will vary based on the number of cylinders in the engine. The balance shaft 108 creates a force, which is equal, and opposite to the forces produced by the reciprocating masses of the connecting rods and pistons. However, since the crankshaft has significant torsional vibration it is advantageous for the balance shafts to be isolated torsionally from the crankshaft. Without this isolation, the chain load gets excessively high and leads to premature failure. The present invention provides this isolation while keeping the balance shafts roughly in time with the engine so that adequate balancing occurs.

Figure 1:
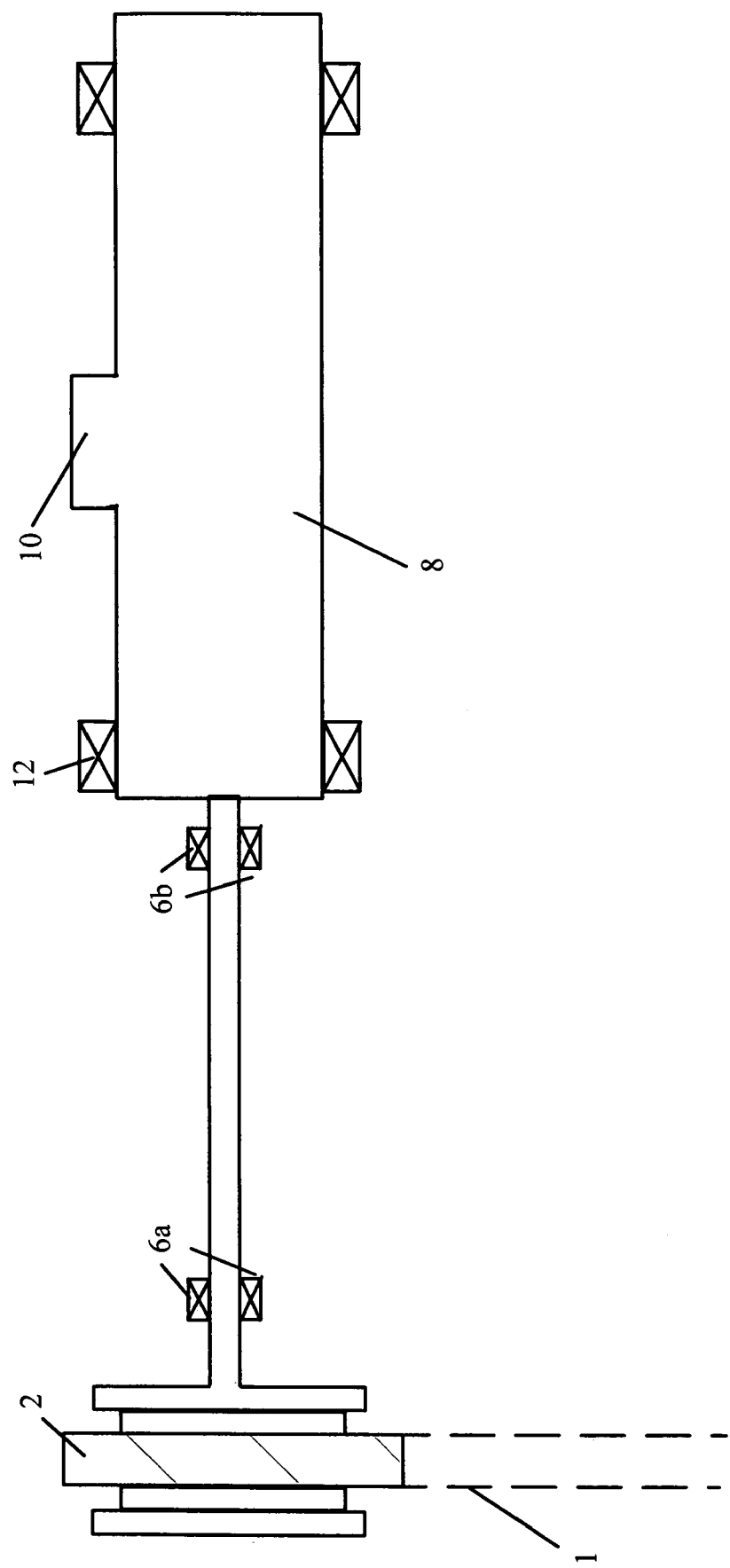
FIG. 1 shows a schematic of a prior art balance shaft.
Figure 2:
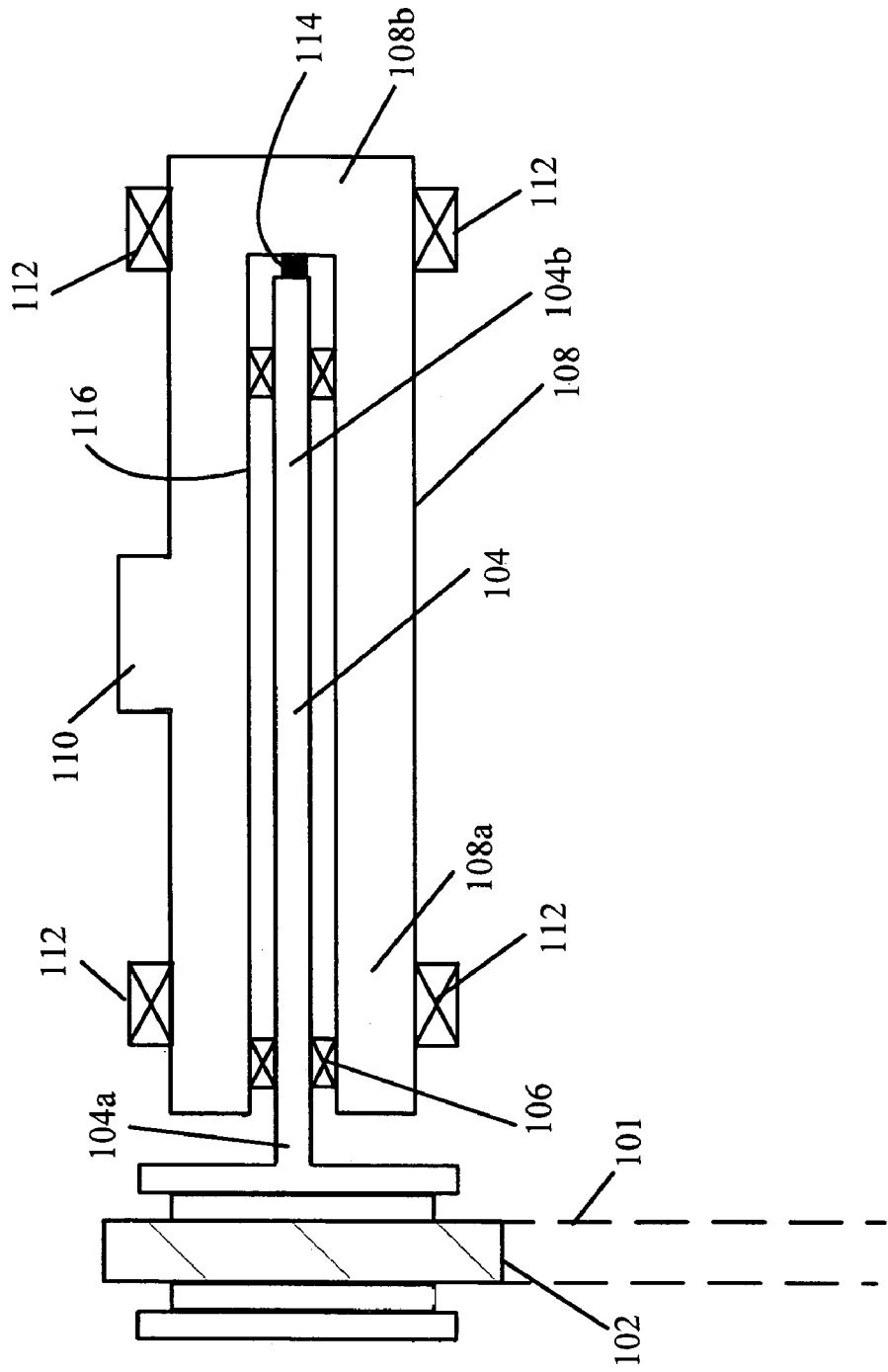
FIG. 2 shows a schematic of the present invention.

Referring to FIG. 2, the balance shaft 108 has a first end 108a and a second end 108b and a weight 110. The first end 108a is connected to a drive sprocket 102. The drive sprocket 102 is driven by chain 101. The sprocket 102 may be similar to that described in U.S. Pat. No. 6,109,227, which is hereby incorporated by reference. The sprocket 102 is also attached to a first end 104a of a torsion bar 104 coaxial to the balance shaft 108 and extending a length within a center cut bore 116 of the shaft 108. The first end of the torsion bar is centered within the bore of the balance shaft by bearings 106. The long length of the balance shaft 108 and thus the torsion bar 104, allows significant isolation of vibrations, while keeping torsional stress bending low. The second end 104b of the torsion bar 104 is fixedly attached to the inner end of the bore 116 within the balance shaft 108 by a fastening means 114. The attachment of the torsion bar 104 to the inner end of the bore 116 in the balance shaft 108 allows the torsion bar 104 to "twist" and absorb torsional vibrations and provides isolation of the balance shaft inertia from the crankshaft torsional vibrations or the drive system as the power from the crankshaft (not shown) is transferred to the chain 101 and then to the sprocket 102.

The balance shafts of the present invention may also be found in inline four cylinder engines, 90 degree V-6 engines, and any other engine which needs a balance shaft.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A drive system for an internal combustion engine including an endless chain connecting a drive sprocket on a crankshaft to a driven sprocket on a camshaft, the drive system comprising:

at least one balance shaft having a first end for connection to the drive sprocket and a center bore;

a torsion bar located within the center bore of the balance shaft having a first end for connection to the drive sprocket and a second end fixedly attached to the bore;

wherein the torsion bar absorbs torsional vibrations and isolates torsional vibrations from inertia of the balance shaft due to the rotation of the crankshaft.

2. The drive system of claim 1, wherein the torsion bar extends a significant length of the balance shaft.

3. The drive system of claim 1, further comprising bearings located between the torsion bar and the balance shaft within the center bore.

* * * * *

UNITED STATES PATENT AND TRADEMARK OFFICE
CERTIFICATE OF CORRECTION

| | |
|---|---|
| PATENT NO. | : 7,252,060 B2 |
| APPLICATION NO. | : 11/181546 |
| DATED | : August 7, 2007 |
| INVENTOR(S) | : Philip J. Mott |

Page 1 of 1

It is certified that error appears in the above-identified patent and that said Letters Patent is hereby corrected as shown below:

Title Page, item (73) Assignee: Please insert; -- BorgWarner Inc., Auburn Hills, MI 48326 (US) --

Signed and Sealed this

Twentieth Day of May, 2008

JON W. DUDAS
*Director of the United States Patent and Trademark Office*